United States Patent [19]

Blankenship et al.

[11] Patent Number: 5,510,422

[45] Date of Patent: Apr. 23, 1996

[54] SYNTHESIS OF LATEX CAPSULES

[75] Inventors: Robert M. Blankenship, Harleysville; Ronald W. Novak, Chalfont; Clarence J. Neyhart, Harleysville; Martin Vogel, Jenkintown; Alexander Kowalski, Plymouth Meeting, all of Pa.

[73] Assignee: Rohm and Haas Company, Philadelphia, Pa.

[21] Appl. No.: 467,642

[22] Filed: Jun. 6, 1995

Related U.S. Application Data

[62] Division of Ser. No. 233,089, Apr. 24, 1994, which is a continuation of Ser. No. 866,924, Apr. 10, 1992, abandoned.

[51] Int. Cl.$^6$ .......................... C08F 265/02; B32B 27/30
[52] U.S. Cl. .................. 525/301; 525/309; 428/402.24
[58] Field of Search .................. 525/301, 309; 428/402.24

[56] References Cited

U.S. PATENT DOCUMENTS 4,427,836  1/1984  Kowalski et al. .................. 525/301
5,409,776  4/1995  Someya et al. .................. 428/402.24

*Primary Examiner*—Vasu S. Jagannathan
*Attorney, Agent, or Firm*—Ronald D. Bakule

[57] ABSTRACT

The present invention is concerned with core and shell polymeric particles having microvoids in the core and one or more channels connecting the microvoids to the exterior of the particle. These particles, or LCAPs are produced by forming a core of polymeric acid, encasing the core in a shell polymer permeable to base, and then neutralizing the core such that the core swells, causing the shell to "explode" in a controlled fashion. This controlled explosion causes channels to form in the shell.

These particles can be used as control release devices for target compounds, to impart reinforcing properties to acrylic films, as an opacifying agent in coating compositions, and as a supplement or replacement of part or all of the pigmentary material or extenders that would otherwise be used in such coating compositions.

4 Claims, No Drawings

SYNTHESIS OF LATEX CAPSULES

This is a divisional of application Ser. No. 08/233,089filed Apr. 24, 1994, which is a continuation of U.S. Ser. No. 07/866,924, filed Apr. 10, 1992, now abandoned.

FIELD OF THE INVENTION

The present invention is concerned with core and shell polymeric particles having microvoids in the core and one or more channels connecting the microvoids to the exterior of the particle. These particles are produced by forming a core of polymeric acid or base, encasing the core in a shell polymer permeable to base or acid, and then neutralizing the core such that the core swells, causing the shell to "explode" in a controlled fashion. This controlled explosion causes channels to form in the shell.

These particles can be used as control release devices for target compounds, to impart reinforcing properties to acrylic films, as an opacifying agent in coating compositions, and as a supplement or replacement of part or all of the pigmentary material or extenders that would otherwise be used in such coating compositions.

BACKGROUND OF THE INVENTION

Kowalski et al., in U.S. Pat. No. 4,427,836 ('836), discloses the production and use of an aqueous dispersion of water-insoluble particulate heteropolymers made by sequential emulsion polymerization. The particles disclosed in the '836 patent have a core of polymeric acid encased in a shell polymer permeable to volatile bases, such as ammonia or an organic amine. The shell is not permeable to permanent, non-volatile bases such as sodium hydroxide. When the particle is exposed to a volatile base, the base permeates the shell and at least partially neutralizes the polymeric acid core, causing the core to swell because of hydration. Upon drying the aqueous dispersion and volatilization of the volatile base and water, an enlarged swollen particle containing a microvoid is formed. Because of the formation of microvoids during drying, the aqueous dispersions of the '836 patent is useful as an opacifying agent in water-based coating compositions.

Kowalski et al., in related U.S. Pat. No. 4,469,825 ('825) discloses core and shell polymer particles wherein the core is composed of polymeric base and is encased in a shell polymer permeable to an acid, such as acetic acid. The polymeric base core is neutralized and swollen with the acid. Similar to the '836 patent, an aqueous dispersion of the acid-swollen, polymeric-base containing core and shell particles of the '825 patent is useful in making water-based coating compositions, wherein microvoids are formed in the cores of the swollen particles upon drying.

Blankenship et al., in U.S. Pat. No. 4,594,363 ('363) also discloses a process for making core and shell polymer particles useful for opacifying coating films. The particles disclosed in the '363 patent are prepared by emulsion polymerizing a core from a core monomer system of at least one ethylenically unsaturated monomer containing acid functionality, encapsulating the core with a hard shell by emulsion polymerizing a shell monomer system in the presence of the core. The shell system is chosen such that the shell permits the penetration of fixed or permanent bases, causing swelling of the core at elevated temperature. When a dispersion of the swollen particles is dried, the microvoids cause opacity.

Kowalski et al., in U.S. Pat. No. 4,468,498 ('498) discloses a similar process as disclosed in '836 for making an aqueous dispersion of core and shell polymers. The particles disclosed in the '498 patent have a core containing sufficient acid groups to render the core swellable by neutralization with a volatile base and have a shell permeable to volatile base. These heteropolymer dispersions are useful in aqueous coating compositions.

Chip et al., in U.S. Pat. No. 4,920,160 ('160) discloses core and shell polymeric particles having a core formed from monomers having acid functionality and a shell free of acid groups. The shell is permeable to non-volatile base, such as sodium hydroxide. The non-volatile base penetrates to the core, neutralizes it, causing swelling of the core. Swelling is achieved at elevated temperatures in the absence of organic solvent. These swollen particles, upon drying in a paint or other composition, have air in the voids and act as opacifying agents.

U.S. Pat. No. 4,677,003 to Redlich et al. relates to a sequential polymerization process for preparing a waterinsoluble dispersion of core and shell particles having a core containing a solvent blend. The core emulsion is prepared by emulsifying in water at high shear a mixture of; hydrophilic solvent; hydrophobic solvent; monomer, including carboxylic acid monomer; anionic surfactant; water-insoluble emulsion stabilizer; and water-insoluble thermal polymerization initiator. The core emulsion is heated to polymerize the initial monomer, forming the core particles. The mixture is a non-solvent for the polymer prepared. Subsequently, a base selected from ammonia and organic amines is added, neutralizing the polymerized carboxylic acid and forming core and shell particles. Optionally, additional monomer is added and polymerized on the core and shell particles. These particles are useful as opacifying agents in coating compositions and also for microencapsulation of organic target materials.

All of the patents discussed hereinabove lead to core and shell particles with microvoids in the center. However, none of the patents disclose core and shell particles with microvoids having a channel from the core, through the shell, to the exterior of the particle. It is an essential feature of all the particles disclosed in the above patents to have a core completely surrounded by the shell. For example, as stated in column 9, line 46–49 of U.S. Pat. No. 4,468,498, properly encapsulated particles have alkali swellable cores that do not titrate with base when exposed to alkali metal bases. This implies the core is completely surrounded.

In general, channels from the core through the shell are undesirable if the particles are to be used as opacifying agents in coating compositions because the channels allow the coating binder to penetrate to the core, filling the microvoids and destroying their opacifying power.

SUMMARY OF THE INVENTION

In the process of the present invention, core and shell particles can be produced by several of the processes discussed above, however, upon swelling of the core with, for example, a volatile base, a non-volatile base or an acid, the core is allowed to swell to such an extent that the pressure produced in the core causes an "explosion." This explosion, or release of pressure, causes at least one channel to form from the core, through the shell, to the exterior of the particles. These particles have been given the terminology latex capsules or "LCAPs."

This channel through the LCAP's shell allows for equilibration of water-soluble or water suspended materials between the two phases. This channel facilitates the rapid equilibration of material between the exterior of the particle and the interior cavity. In addition to using these latex capsules as control release devices for target compounds these capsules impart unique reinforcing properties to acrylic films.

Surprisingly, the latex capsules are good opacifying agents in certain coating compositions, superior to similar particles without channels through the shell, particularly in coatings with very high pigment loadings and low levels of binder.

DETAILED DESCRIPTION OF THE INVENTION

The patents discussed herein-above disclose several suitable synthesis methods for preparing core and shell particles. These methods disclosed can be used to prepare core and shell particles which can be modified to produce the LCAPs of the present invention. These patents, U.S. Pat. Nos. 4,920,160, 4,594,363, 4,469825, 4,468,498 and 4,427,836 are all herein incorporated by reference.

The core-shell polymers useful in the present invention are preferably prepared by a multistage, sequential, emulsion polymerization process such as described in U.S. Pat. No. 4,427,836. While the core may be made in a single stage or step of the sequential polymerization and the shell may be the product of a single sequential stage or step following the core stage, the making of the core component may involve a plurality of steps in sequence followed by the making of the shell which may involve a series of sequential steps as well.

Thus, the first stage of emulsion polymerization in the process of the present invention may be the preparation of a seed polymer containing small dispersed polymer particles insoluble in the aqueous emulsion polymerization medium. This seed polymer may or may not contain any acid component but provides particles which form the nuclei on which the core polymer of acid monomer, with or without nonionic comonomer(s), is formed.

As is common to aqueous emulsion polymers, a water-soluble free radical initiator is used, such as hydrogen peroxide, tert-butyl peroxide, or an alkali metal (sodium, potassium or lithium) or ammonium persulfate or a mixture of such an initiator with a reducing agent, such as a sulfite, (more specifically an alkali metal metabisulfite, hydrosulfite, or hyposulfite, or sodium formaldehyde sulfoxylate) to form a redox system. The amount of initiator may be from 0.01 to about 2% by weight of the monomer charged and in a redox system, a corresponding range (0.01 to about 2%) of reducing agent may be used.

The temperature of the aqueous emulsion polymerization is preferably in the range of about 10° C. to 100° C. Higher temperatures can be used under appropriate reaction conditions. In the case of the persulfate systems, the temperature is preferably in the range of 60° C. to 90° C. In the redox system, the temperature is preferably in the range of 30° C. to 70° C., preferably 30° C. to 60° C., more preferably in the range of 40° C. to 60° C.

Any suitable nonionic or anionic emulsifier may be used, either alone or together. Examples of the nonionic type of emulsifier include tert-octylphenoxyethylpoly(39)-ethoxyethanol, and nonylphenoxyethylpoly(40)-ethoxyethanol. Examples of anionic emulsifiers include sodium lauryl sulfate, sodium dodecylbenzenesulfonate, and tert-octylphenoxyethoxypoly(39)-ethoxyethyl sulfate. The proportion of emulsifier may be zero, in the situation wherein a persulfate initiator is used, to about 0.3 weight percent based on the weight of monomer charged to the first stage of polymerization.

The molecular weight of the polymer formed in a given stage may range from 100,000 or lower if a chain transfer agent is used, to several million. The acid-containing core polymer, whether obtained by a single stage process or a process involving several stages, has an average size of about 0.02 to about 1.0., preferably 0.1 to 0.5, more preferably 0.2 to 0.5 micron diameter in unswollen condition. If the core is obtained from a seed polymer, the seed polymer may have an average size in the range of 0.02 to 0.2 micron diameter.

The core component is the product of aqueous emulsion polymerization of one or more monoethylenically unsaturated monomers containing a group of the formula —HC=C>, wherein at least about 5 mole percent or more of said monomers contain a carboxylic acid group or an anhydride group. Examples of suitable monoethylenically unsaturated monomers include styrene, vinyltoluene, ethylene, vinyl acetate, vinyl chloride, vinylidene chloride, acrylonitrile, acrylamide, methacrylamide, and various ($C_1$–$C_{20}$) alkyl or ($C_3$–$C_{20}$) alkenyl esters of acrylic or methacrylic acid, such as methyl methacrylate, methyl acrylate, ethyl acrylate, ethyl methacrylate, butyl acrylate, butyl methacrylate, 2-ethylhexyl acrylate, 2-ethylhexyl methacrylate, benzyl acrylate, benzyl methacrylate, lauryl acrylate, lauryl methacrylate, palmityl acrylate, palmityl methacrylate, stearyl acrylate, stearyl methacrylate and the like. Examples of suitable monomers containing a carboxylic acid group or an anhydride group include acrylic acid, methacrylic acid, itaconic acid, aconitic acid, maleic acid, maleic anhydride, fumaric acid, crotonic acid, acryloxypropionic acid methacryloxypropionic acid, acryloxyacetic acid, methacrylic anhydride, methacryloxyacetic acid, monomethyl acid maleate, monomethyl acid itaconate, monomethyl fumarate and the like.

Although the core component can be prepared from monomers wherein at least 5 mole percent of said monomers contain a carboxylic acid group or an anhydride group, it is preferred that at least 10 mote percent of said core monomers have a carboxylic acid group or an anhydride group, more preferably at least about 30 mole percent of said core monomers have a carboxylic acid group or an anhydride group. The preferred core monomers having a carboxylic acid group or an anhydride group are acrylic acid, methacrylic acid, acryloxypropionic acid methacryloxypropionic acid, acryloxyacetic acid, methacryloxacetic acid, monomethyl acid maleate, monomethyl acid itaconate, crotonic acid, aconitic acid, maleic acid, maleic anhydride, fumaric acid and monomethyl fumarate. The most preferred acid-containing core monomer is methacrylic acid.

After the acid core is obtained, a subsequent stage or stages of emulsion polymerization is effected to form a shell polymer on the acid core polymer particles. This may be performed in the same reaction vessel in which the formation of the core was accomplished or the reaction medium containing the dispersed core particles may be transferred to another reaction container. It is generally unnecessary to add emulsifier unless a polymodal product is desired, but in certain monomer/emulsifier systems for forming the shell, the tendency to produce gum or coagulum in the reaction medium may be reduced or prevented by the addition of about 0.05 to about 0.5% by weight, based on shell monomer weight, of emulsifier without detriment to the deposition of the shell polymer formed on the previously-formed core particles.

The monomers used to form the shell polymer on the acid core particles may be any of the monoethylenically unsaturated comonomers mentioned hereinbefore for the making of the core. The monomers used and the relative proportions thereof in any copolymers formed should be such that the shell thereby formed is permeable to organic or inorganic bases. In spite of their hydrophobicity, the extremely nonpolar or low-polar monomers (namely, styrene, alpha-methyl styrene, vinyltoluene, ethylene, vinyl chloride and vinylidene chloride) are useful alone or in admixture with more highly polar monomers, such as vinyl acetate. Monomeric mixtures for making the shell preferably contain less ,than about 10 mole percent, more preferably less than about 5 mole percent of monomers having a carboxylic acid group or an anhydride group. However, the equivalents of acid in the shell polymer should not exceed one-third the equivalents thereof in the core polymer. The content of acid monomers serves either or both of two functions; namely, stabilization of the final sequential polymer dispersion and assuring permeability of the shell to a base swellant. The shell has a glass transition temperature from about −40° C. to about 100° C.

The amount of polymer forming the shell component is generally such as to provide an overall size of the core-shell polymer of about 0.07 to about 4.5 microns, preferably about 0.1 to about 3.5 microns, and more preferably about 0.2 to about 2.0 microns in unswollen condition before any neutralization to raise the pH to about 6 or higher. It is preferable to select the amount of polymer such that a thin shell is formed which will explode upon neutralization and form an LCAP upon swelling. In the unswollen, unneutralized state, the weight ratio of core polymer to the shell polymer ranges from about 1:1 to about 1:20, preferably from about 1:1 to about 1:10.

Once the core-shell polymer particles are formed, they are swollen by subjecting the particles to an organic or inorganic base that permeates the shell and neutralizes the core. This neutralization with base causes the core-shell polymer particles to absorb water from the surrounding medium and swell to such an extent as to cause the core-shell particle to explode, forming an LCAP. During this swelling step, it has been found that LCAPs can most effectively be formed if the concentration of the particles in the aqueous medium is preferably from about 15 to 35% by weight.

Any organic or inorganic base can be used to neutralize and swell the core-shell polymer particles to form LCAPs. These bases include, for example, ammonia, amines, sodium hydroxide, potassium hydroxide, lithium hydroxide and the like. The more preferred base is ammonia.

If the glass transition temperature (Tg) of the core or shell is above standard ambient temperature, it may be necessary to heat the core-shell polymers above their Tg, or to add a solvent to soften the polymer particles, to effect swelling. The time of exposure to the swelling agent is from about 0.5 to 24 hours, depending on the acid content of the core. The greater the acid content, the faster the degree of swelling and therefore the less the time. If the acid content is low, the temperature can be increased to facilitate swelling. The degree of swelling is also dependent on the hardness of the shell.

The LCAP particles of the present invention are formed using the processes described above, provided the formation conditions are sufficient to allow for the formation of channels upon swelling of the particles. For example, several parameters that can be varied are the thickness of the shell, "softness" of the shell, acid level of the core, permeability of the shell to the swelling agent, and exposure time and temperature of the particles to the swelling agent.

The LCAPs of this invention are useful to encapsulate aqueous-containing compositions which contain biologically-or chemically-active materials, such as, for example, pesticides, fungicides, and fire retardants. The LCAPs containing the encapsulated biologically- or chemically-active material can then be used for controlled release of the encapsulated material.

The process of forming an LCAP can also be used to release specific compounds from the core of a core-shell particle. For example, core-shell particles can be used as thickeners whereby, prior to LCAP formation, a thickener compositions is encapsulated within the core-shell particle. Then, when the LCAP is formed, the thickener composition is released.

In addition, the LCAPs are useful for imparting reinforcing properties to acrylic films, as an opacifying agent in coating compositions, and as a supplement or replacement of part or all of the pigmentary material or extenders that would otherwise be used in such coating compositions. When used to reinforce films or when used as an opacifying agent, it is preferable the amount of LCAPs be from about 5 to 40% by dry weight.

Other uses of LCAPs are, for example, in paper coatings and as a method of separation whereby molecules of particular sizes are trapped within LCAPs of specific sizes. In paper coatings, LCAPs can be used in topcoats for printing grades at an amount of from about 1 to 30% of the dry weight. When used in thermally insulating basecoats for facsimile paper, the amount of LCAP is from about 20 to 90% of the dry weight.

The following specific examples are intended to illustrate specific embodiments of the invention and should not be interpreted as narrowing the broader aspects of the invention. All percentages in the following examples are weight percentages unless otherwise indicated.

EXAMPLE 1

Core-shell polymer was prepared by sequential emulsion polymerization as described in U.S. Pat. No. 4,427,836. The composition of the core polymer was 5% butyl acrylate, 65% methyl methacrylate and 30% methacrylic acid. The composition of the shell polymer was 40% ethyl acrylate, 58.5% methyl methacrylate and 1.5% methacrylic acid. The ratio of core polymer to shell polymer was 1:7. The shell polymer had a glass transition temperature of 55° C. The final dispersion of core-shell polymer had a total solids of 48.4%.

A sample was titrated with 0.5N KOH. No core methacrylic acid was detected. Therefore, it was concluded the core was well encapsulated by the shell.

To determine the amount of core acid expulsed on rupture of the core-shell particle to form LCAPs and the accompanying water uptake, a portion of the dispersion was diluted to 10% solids and neutralized with 1.5 equivalents of 28% aqueous ammonia. This mixture was heated to 40°, 60°and then 95° C. while samples were withdrawn periodically and then cooled to room temperature. Approximately 30 grams of each of the heated samples were centrifuged on a Sorval table top centrifuge at 8,000 RPM for 1.5 hours, separating the LCAPs from the aqueous serum.

The supernatant liquid was poured off, the weight noted, and titrated with 0.5N HCl using a Radiometer Automatic Titrator.

The core acid (pKa around 6.5) was calculated by:

$$\frac{\text{ml Titer} \times 0.5 \text{ N Acid}}{(\text{theory meq/g core acid})(\text{g poly})} \times 100 = \% \text{ Core Acid Expulsed}$$

The water uptake was determined by the following calculation:

$$\frac{((\text{g samp} - \text{g. super}) - \text{g solids}) - 0.4(\text{g solids})}{\text{g solids}} = \text{water uptake}$$

The value 0.4 is an approximation of the correction for interstitial water in the plug. This was determined separately on polymer of similar composition and particle size. Table 1 summarizes the data.

TABLE 1

Effect of Time and Temperature on the Ammonia Neutralization of Encapsulated High Acid Cores[1]

| Time[2] (hrs.) | Temp °C. | Supernatant, g | Meq acid/ Supernatant, g | % Core acid in Supernatant g | Water Uptake $H_2O$/g polymer |
|---|---|---|---|---|---|
| +0.5 | 40 | 23.68 | 0.0000 | 0.0 | 0.97 |
| +1.0 | 40 | 22.20 | 0.0000 | 0.0 | 1.47 |
| +2.0 | 40 | 21.15 | 0.0000 | 0.0 | 1.82 |
| +4.0 | 40 | 20.80 | 0.0029 | 4.6 | 1.93 |
| +17.0 | 40 | 19.68 | 0.0070 | 10.7 | 2.3 |
| +1.0 | 60 | 18.35 | 0.0136 | 19.1 | 2.75 |
| +2.0 | 60 | 20.02 | 0.0250 | 38.2 | 2.19 |
| +17.0 | 60 | 20.20 | 0.0400 | 61.2 | 2.13 |
| +17.0 | 95 | 20.63 | 0.0460 | 72.0 | 1.99 |

[1]Particle from Example 1-Core (1 part) 5 BA/65 MMA/30 MAA and shell (7 parts) 40 EA/58.5 MMA/1.5 MAA. All samples were neutralized with 1.5 Eq. ammonia on core acid at 10% total solids.
[2]All samples to be titrated were taken from the same vessel. The time indicates the incremental time at which the samples were taken.

The data in Table I show that the core-shell polymer, after reaching a certain degree of swelling (>1.9 g $H_2$/g of polymer), starts exploding and releasing core acid into the external aqueous phase; the more swelling, the more exploding. After around 20% of the core acid has appeared in the aqueous phase, there appears to be some reduction in swelling which may be due to some relaxation of the stretched shell after the core has been expulsed.

EXAMPLE 2

An LCAP was prepared according to the process of Example 1 only having a harder shell (25% ethyl acrylate, 73.5% methyl methacrylate and 1.5% methacrylic acid); a portion was swollen with excess ammonia at temperatures above 80° C. until most of the core acid was expulsed into the serum. This LCAP was evaluated as a reinforcing agent for polymer films. Films were prepared using no, 5 and 10% core/shell polymer (unswollen, no channel) and 5 and 10% of the LCAP with a polymer having a composition of 98.2 BA/1.8 MAA. A 30 mil film was formed from each composition and dried for two weeks. The physical properties of these films were measured and the results are shown in Table 2.

Films d and e containing LCAPs are stronger and have less elongation and are thus more reinforced than the controls a, b and c.

TABLE 2

FILM STRESS-STRAIN PARAMETERS: AVERAGE VALUES XHEAD = 20 IN/MIN, GAP = 0.5 IN

| SAMPLE* | BREAK STRGTH (PSI) | % ELONG × $10^{-2}$ | YIELD STRESS (PSI) |
|---|---|---|---|
| a (Comparative) | 27.5 | 4.4 | 9.0 |
| b (Comparative) | 29.2 | 4.0 | 10.0 |
| c (Comparative) | 28.1 | 3.6 | 10.9 |
| d | 30.6 | 3.4 | 14.0 |
| e | 34.4 | 2.7 | 24.7 |

TABLE 2-continued

FILM STRESS-STRAIN PARAMETERS: AVERAGE VALUES XHEAD = 20 IN/MIN, GAP = 0.5 IN

| SAMPLE* | BREAK STRGTH (PSI) | % ELONG × $10^{-2}$ | YIELD STRESS (PSI) |
|---|---|---|---|

*a-(98.2 BA/1.8 MAA) + no LCAP
b-(98.2 BA/1.8 MAA) + 5% core/shell polymer (unswollen, no channel)
c-(98.2 BA/1.8 MAA) + 10% core/shell polymer (unswollen, no channel)
d-(98.2 BA/1.8 MAA) + 5% LCAP
e-(98.2 BA/1.8 MAA) + 10% LCAP

EXAMPLE 3

Preparation of Acrylic Seed Latex

A 5-liter flask equipped with paddle stirrer, thermometer, nitrogen inlet, and reflux condenser was charged with 2000 grams of deionized water. The water was heated to 85° C. under nitrogen atmosphere with stirring and 0.4 grams of Alipal EP-110 (ammonium salt of sulfated alkylphenol ethoxylate, 9 moles of ethylene oxide, 30% solids) was added to the flask. Then 164 grams of a monomer emulsion was added to the flask. The monomer emulsion was prepared from 770 grams of deionized water, 5.2 grams of Alipal EP-110, 780 grams of methyl methacrylate, and 10.4 grams of methacrylic acid. This was followed by the addition of 5.5 grams of sodium persulfate dissolved in 40 grams of deionized water. The temperature of the reaction mixture was allowed to rise. To the previously prepared monomer emulsion, an additional 20 grams of Alipal EP-110 and 510 grams of methacrylic acid were added. Fifteen minutes after the addition of the sodium persulfate solution to the flask, a gradual addition of the remaining monomer emulsion was begun at a rate of 15 grams/minute. The temperature was allowed to rise to 85° C., where it was maintained throughout the monomer addition.

Fifteen minutes after the monomer addition was completed, the reaction mixture was cooled to 25° C. Then the product was filtered through a 100 mesh screen. The product had a pH of 2.5, 30.0% total solids and an average particle diameter of 218 nm (Coulter Nano-Sizer).

EXAMPLE 4

Comparative

Preparation of Core/Shell Particle

To a 5-liter flask equipped with paddle stirrer, nitrogen inlet, reflux condenser, and thermometer was added 2350 grams of deionized water. The water was heated to 80° C. under nitrogen atmosphere and then 1.7 grams of sodium persulfate dissolved in 40 grams deionized water, followed by 167 grams of the acrylic seed polymer dispersion of Example 3 was added to the flask. A monomer emulsion of 50 grams of deionized water, 2.0 grams of Alipal EP-110, 200 grams of vinyl acetate, 188 grams of methyl methacrylate, 8.0 grams of 1,3-butylene glycol dimethacrylate, and 4.0 grams of methacrylic acid was then gradually added to the flask over 75 minutes. The temperature was allowed to rise to 80° C. where it was maintained throughout the addition of the monomer emulsion. Concurrent with the addition of the monomer emulsion, 1.3 grams of sodium persulfate dissolved in 60 grams of deionized water was gradually added to the flask at a rate of 0.5 grams/minute. Ten minutes after the completion of the monomer addition, 45 grams of 28 percent aqueous $NH_3$ was added to the flask.

A second monomer emulsion of 37.5 grams of deionized water, 1.7 grams of Alipal EP-110 and 300 grams of styrene was gradually added to the flask over 47 minutes. The temperature was allowed to rise to 85° C. where it was maintained throughout the monomer addition. After the completion of the monomer addition, 1.3 grams of sodium persulfate dissolved in 60 grams of deionized water was added to the flask. The temperature of the reaction mixture was maintained at 85° C. for 30 minutes, then cooled to 25° C.

The product was filtered through a 100 mesh screen. The product had a pH of 9.7, a total solids of 20.6 percent, an average particle diameter of 0.66 microns (Coulter Nano-Sizer), titratable acid of 27.5 percent of theoretical (see following section on Polymer Characterization Part A), dry bulking value of 0.2296 gallon/lb (see Polymer Characterization Part B). When viewed by optical microscopy (see Polymer Characterization Part C), nearly every particle was seen to contain a single dark spot in the center, indicative of an encapsulated air bubble and when viewed by transmission electron microscopy (TEM), the polymer particles were seen to have light centers with dark and complete shells.

EXAMPLE 5

To a 5-liter flask equipped with paddle stirrer, nitrogen inlet, reflux condenser, and thermometer was added 2350 grams deionized water. The water was heated to 80° C. under nitrogen atmosphere and then 1.7 grams of sodium persulfate dissolved in 40 grams of deionized water, followed by 267 grams of the acrylic seed polymer dispersion of Example 3 was added to the flask. A monomer emulsion of 50 grams of deionized water, 2.0 grams of Alipal EP-110, 200 grams of vinyl acetate, 196 grams of methyl methacrylate, and 4.0 grams of methacrylic acid was gradually added to the flask over 75 minutes. The temperature was allowed to rise to 80° C. where it was maintained throughout the addition of the monomer emulsion. Concurrent with the addition of the monomer emulsion, 1.3 grams of sodium persulfate dissolved in 60 grams of deionized water was gradually added to the flask at a rate of 0.5 grams/minute. Ten minutes after the completion of the monomer addition, 45 grams of 28 percent aqueous $NH_3$ was added to the flask.

A second monomer emulsion of 50 grams of deionized water, 2.0 grams of Alipal EP-110 and 400 grams of styrene was gradually added to the flask over 52 minutes. The temperature was allowed to rise to 85° C. where it was maintained throughout the remainder of the monomer addition. After the completion of the monomer addition, 1.3 grams of sodium persulfate dissolved in 60 grams of deionized water was added to the flask. The temperature of the reaction mixture was maintained at 85° C. for 30 minutes, then cooled to 25° C.

The product was filtered through a 100 mesh screen. The product had a pH of 9.8, a total solids of 22.4 percent, an average particle diameter of 0.65 microns (optical microscopy), a total titratable acid of 86.8 percent (see Polymer Characterization Part A), and a dry bulking value of 0.2465 gallon/lb (see Polymer Characterization Part B). When viewed by optical microscopy (see Polymer Characterization Part C), few particles had dark centers; this is due to the ability of the immersion oil to readily fill the microvoids through the channels in the shell. When viewed by transmission electron microscopy (TEM), the polymer particles were seen to have light centers due to microvoids with channels in the shells, as evidenced by light areas in the shell.

EXAMPLE 6

The core-shell polymers of Examples 4 and 5 were compared in coatings containing a low level of pigmentation: 15 parts (solids) core-shell polymer with 85 parts (solids) of a film-forming latex with composition 65% butyl acrylate, 34% methyl methacrylate and 1% methacrylic acid (by weight). The blends were drawn down on black vinyl charts (The Leneta Co., Form P-121-10N) with a 7 mil Dow Applicator and the films were allowed to dry in a refrigerator at 1° C. The dry films (1.7 mils thick) were examined by optical microscopy and Kubelka-Munk scattering coefficients (S) were measured by the method of Minton and Jacobson (Off. Digest, September 1963, pp. 871–911) as a quantitative measure of microvoid content and opacity of the dried films.

The film containing the core-shell particles of Example 5 was clear and no microvoids could be seen by microscopy due to binder filling the cores through the channels; S/mil was 0.00. The film containing the Example 4 comparative particles was whitish due to microvoids which could be seen easily with the microscope at 900X and were around 500 nm in diameter; S/mil was 0.10. Thus, the comparative particles (Example 4) with no channels through the shells are the better opacifiers in these films with high binder content. In Example 7 below, the same two core-shell particles were compared in films with high pigment content (62.5% by volume) and the opacifying performance is reversed: the particle with channels (Example 5) surprisingly are the better opacifiers.

Polymer Characterization

A. Titratable Acid Determination

To 20 grams of polymer dispersion from Example 4 or 5, was added 40 grams of deionized water. Next, 10 grams of Amberlite (R) IR-120 Plus (H) −20 +40 ion exchange resin was added and mixed vigorously for 20 minutes. The mixture was then filtered through cheese cloth to remove the ion exchange resin and the total solids were determined. 20 grams of the treated dispersion were titrated with 0.5N NaOH to a final pH of 11.5. The milliequivalents of acid titratable (from pH 5 to pH 9.5) per gram of polymer titrated were determined. Next, the milliequivalents were divided by the theoretical total carboxylic acid, and expressed as milliequivalents per gram of polymer; then multiplied by 100. The result was the titratable carboxylic acid expressed as percentage of total acid.

B. Determination of Dry Bulking Value

A portion of the polymer dispersion from Example 4 and 5 was diluted to 18% total solids. Similarly, a polymer dispersion prepared in the same method as Example 4 and 5, except for the addition of 28% aq. $NH_3$ was treated. 40 g of each diluted dispersion was added to two separate 50 ml centrifuge tubes. The samples were centrifuge at 15,000 RPM for 50 minutes (Sorvall Superspeed Centrifuge equipped with SS-34 rotor). The sample was decanted and the clear supernatant weighed. The density of the undiluted polymer dispersion from Example 4 and 5 were separately determined. The dry bulking values were determined using Equation 1.

EQUATION 1

$$BV_{dry}=[1-(1-x)(d_{latex})][(d_{latex})(x)(40-z)]^{-1}(0.1202)(40-y)$$

where:

x=solids of undiluted polymer dispersion y=weight, in grams, of supernatant from neutralized latex z=weight, in grams, of supernatant from unneutralized latex $d^{latex}$=density, in grams/cc, of the undiluted polymer dispersion (0.1202=converts from cc/g to gallons/lb)

C. Optical Microscopy

A sample of polymer dispersion from Example 4 and 5 was dried to a powder. The dry powder was immersed in hydrocarbon oil ($n_D$=1.51) and viewed by optical microscopy. If the polymer dispersion consisted of particles containing single microvoids with complete shells, many particles with dark centers were seen (Example 4). If the polymer dispersion was made up of particles with microvoids predominately with channels through the shells, few particles with dark centers were seen; the particles with channels through the shell are faintly visible (Example 5).

EXAMPLE 7

Two paints were formulated both of whose pigment volume concentrations were 9% Ti-Pure R-900 ($TiO_2$), 18.5% Optiwhite P (clay), 10% Veramite (calcium carbonate) and 25% of the polymers of Examples 4 and 5; the paint volume solids were 33% in both cases: the Ti-Pure R-900 (99.3 parts by weight), Optiwhite P (112.4 parts) and Veramite (74.6 parts) were dispersed in 112.5 parts of water, 23.2 parts of ethylene glycol, 4.8 parts of 30% Tamot 850 dispersant, 2 parts of Colloid 643 defoamer and 2 parts of AMP-95 auxiliary dispersant using a Cowles Model 1-VJ Dissolver at high speed. At slower speed, Colotrend B lamp black dispersion was added to give a final dry paint Y-reflectance of around 50%.

To half of the above tinted grind was added 109.2 parts of UCAR 367 latex binder (vinyl acetate/butyl acrylate copolymer, 55% solids), 86.6 parts of the hollow core-shell dispersion from Example 4, 3.2 pads of Texanol coalescent, 1 part of Colloid 643, 0.5 part of Nuocept 95 preservative, 7.5 parts of 32% Acrysol TT-935 thickener, 1 part of 28% aqua ammonia, and 96.1 parts of water. A second paint was formulated similarly using the other half of the tinted grind only 75.2 parts of the polymer dispersion from Example 5 was used and the water was increased to 107.5 pads. The dry bulking values measured in Example 4 and 5 were used to calculate the amount of core-shell dispersion required to give 25% volume concentration. Both paints were allowed to equilibrate for three days and then were drawn down on vinyl charts with a 7 mil bar and allowed to dry for 7 days at 75° F. and 50% relative humidity. The dry films were around 1.2 mils thick and completely opaque. Reflectance readings were made with a Colorgard instrument (Gardner Instruments) and averaged 0.458 and 0.474, respectively, for the Example 4 and 5 paints. From Kubelka-Munk theory, $S/K=2R/(1-R)$ where R is the reflectance of a thick (opaque) film and S and K are the scattering and adsorption coefficients of the paint, respectively. Since both paints are tinted with the same concentration of lamp black, K can be assumed to be constant and R will vary directly with S. From the above equation, S is 10% higher in the paint made with Example 5 dispersion of this invention than in the paint made with Example 4 dispersion of the prior art; the higher S value means that in thin paint films, the Example 5 paint will be more opaque than the Example 4 paint at equal thickness.

We claim:

1. An improved process for making an aqueous dispersion of water-insoluble polymer particles comprising:

(a) sequentially emulsion polymerizing in an aqueous medium containing a free radical initiator, a core monomer system comprising one or more monoethylenically unsaturated monomers and at least about 5 mole percent of an ethylenically unsaturated carboxylic acid or anhydride monomer, whereby dispersed core particles are formed having an average diameter of from about 0.05 to 1 micron, and (b) polymerizing in the presence of the dispersed core particles resulting from (a), a shell monomer system comprising: at least one monoethylenically unsaturated monomer having no ionizable group to form a shell polymer on the core particles, wherein any monoethylenically unsaturated carboxylic acid in the shell monomer mixture is present in an amount of no more than about 10 mole percent of the shell monomers, wherein the equivalents of acid in said shell polymer do not exceed one-third of the equivalents of acid in said core particle, the resultant core-shell particles having an average diameter before neutralization and swelling of from about 0.07 to 4.5 microns, the relative amounts of core-forming monomer(s) and shell-forming monomer(s) being such that the ratio of the weight of the core to the weight of the total polymer in the resulting dispersed particles is from about 1:2 to 1:100, and (c) neutralizing said particles formed with a base so as to swell said core and form particles containing a microvoid in the core, wherein the improvement comprises swelling said core to a point where said shell explodes, forming particles containing a microvoid in the core and at least one channel connecting the microvoids to the exterior of the particle.

2. A method of using the particles produced by the process of claim 1 in an effective amount to strengthen polymer films.

3. A method of using the particles produced by the process of claim 1 in an effective amount as an opacifying agent in coating compositions.

4. A method of using the particles produced by the process of claim 1 in an effective amount in paper coating compositions.

* * * * *